US009260069B2

(12) United States Patent
Okuda

(10) Patent No.: US 9,260,069 B2
(45) Date of Patent: Feb. 16, 2016

(54) SHOCK ABSORBING MEMBER

(75) Inventor: Nobuhisa Okuda, Aichi (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 270 days.

(21) Appl. No.: 13/988,333

(22) PCT Filed: Nov. 14, 2011

(86) PCT No.: PCT/JP2011/076150
§ 371 (c)(1),
(2), (4) Date: Aug. 7, 2013

(87) PCT Pub. No.: WO2012/073680
PCT Pub. Date: Jun. 7, 2012

(65) Prior Publication Data
US 2013/0306419 A1    Nov. 21, 2013

(30) Foreign Application Priority Data

Dec. 1, 2010  (JP) .................................. 2010-268258
Apr. 14, 2011  (JP) .................................. 2011-090158

(51) Int. Cl.
*F16F 7/12* (2006.01)
*B60R 19/34* (2006.01)

(52) U.S. Cl.
CPC .. B60R 19/34 (2013.01); F16F 7/12 (2013.01)

(58) Field of Classification Search
CPC ............. F16F 7/12; F16F 15/02; F16F 7/121; B60R 19/03; B60R 19/34

USPC .......... 188/377, 376; 267/116; 293/102, 120, 293/122, 132, 133; 296/187.03, 187.09
See application file for complete search history.

(56) References Cited

U.S. PATENT DOCUMENTS

| 3,847,426 | A | * | 11/1974 | McGettigan | ................... | 293/133 |
| 5,443,146 | A | * | 8/1995 | Ayyildiz et al. | ................ | 188/374 |
| 7,192,067 | B2 | * | 3/2007 | Hansen | .......................... | 293/133 |
| 7,766,403 | B2 | * | 8/2010 | Alvarsson et al. | ............ | 293/133 |
| 2004/0056469 | A1 | | 3/2004 | Karaki et al. | | |

FOREIGN PATENT DOCUMENTS

| JP | 2001-182769 A | 7/2001 |
| JP | 2001-246995 A | 9/2001 |
| JP | 2008-180378 A | 8/2008 |
| WO | WO 02/50449 A1 | 6/2002 |

* cited by examiner

*Primary Examiner* — Pamela Rodriguez
(74) *Attorney, Agent, or Firm* — Christensen Fonder P.A.

(57) ABSTRACT

A shock absorbing member may include a cylindrical member that is configured to receive an impact load axially applied and to be axially collapsed, a wood member that is received in the cylindrical member while an axial direction of annual rings thereof is aligned with an axial direction of the cylindrical member, and positioning means for positioning axially both end portions of the wood member relative to axially both end portions of the cylindrical member such that a clearance can be formed between an outer surface of the wood member and an inner wall surface of the cylindrical member over an entire circumference thereof. The wood member and the cylindrical member are configured to receive the impact load in an axial direction thereof.

8 Claims, 9 Drawing Sheets

Clearance (0.8mm)

Clearance (1.3mm)

SHOCK ABSORBING MEMBER

PRIORITY CLAIM

The present application is a National Phase entry of PCT Application No. PCT/JP2011/076150, filed Nov. 14, 2011, which claims priority from Japanese Patent Application No. 2010-268258, filed Dec. 1, 2010, and Japanese Patent Application No. 2011-090158, filed Apr. 14, 2011, the disclosures of which are hereby incorporated by reference herein in their entirety.

TECHNICAL FIELD

The present invention relates to a shock absorbing member that is configured to be capable of receiving an impact load generated in the event of a vehicle collision or other such accidents and effectively absorbing the impact load.

BACKGROUND ART

Japanese Laid-Open Patent Publication No. 2001-246995 discloses an art relating to a shock absorbing member that is configured to be capable of receiving an impact load generated in the event of a vehicle collision or other such accidents and absorbing the impact load.

As shown in FIG. 19, a shock absorbing member 100 described in Japanese Laid-Open Patent Publication No. 2001-246995 is composed of an aluminum alloy cylindrical housing 102 and a high rigidity foamed elastic body 104 that is received within the housing 102. The shock absorbing member 100 may be used for a bumper, a door impact beam or other such devices of a vehicle, so as to receive an impact load generated in the event of a vehicle collision by a side surface of the cylindrical housing 102 and to absorb the impact load and vibration energy.

In the shock absorbing member 100 described above, the impact load of the vehicle can be received mainly by the housing 102. That is, the impact load cannot be received only by the foamed elastic body 104. Therefore, in a case that the shock absorbing member 100 is used under a high load condition, the cylindrical housing must be increased in strength. For that purpose, it is necessary to take measures such as increasing a wall thickness of the housing 102, or dividing an interior portion of the housing 102 into a plurality of compartments using partitions or other such members. As a result, the shock absorbing member 100 can be increased in weight and can be structurally complicated. This may lead to increased costs.

Thus, there is a need in the art to provide an improved shock absorbing member.

SUMMARY OF THE INVENTION

A first aspect of the present invention provides a shock absorbing member which may include a cylindrical member that is configured to receive an impact load axially applied and to be axially collapsed, a wood member that is received in the cylindrical member while an axial direction of annual rings thereof is aligned with an axial direction of the cylindrical member, and positioning means for positioning the wood member relative to the cylindrical member such that a clearance can be formed between an outer surface of the wood member and an inner wall surface of the cylindrical member over an entire circumference thereof. The wood member and the cylindrical member are configured to receive the impact load in an axial direction thereof.

According to a first aspect of the present invention, the wood member may be received in the cylindrical member while the axial direction of the annual rings thereof is aligned with the axial direction of the cylindrical member. Therefore, the impact load axially applied can be received by the annual rings of the wood member. As a result, a high load can be received by the wood member.

Further, because the clearance may be formed between the outer surface of the wood member and the inner wall surface of the cylindrical member, when the cylindrical member is axially crashed with the wood member, the cylindrical member can be easily deformed radially inwardly. As a result, the cylindrical member can be crashed into the bellows-shape around the wood member. Thus, the wood member can be circumferentially supported by the cylindrical member crashed into the bellows-shape in a balanced manner, so as to be less likely to fall down. As a result, the axial load can be effectively received by the wood member. Thus, the wood member and the cylindrical member can be axially collapsed, so that the high load can be effectively absorbed.

Further, the shock absorbing member can be formed by simply introducing the wood member into the cylindrical member. Therefore, the shock absorbing member can be simplified in structure, so that costs thereof can be reduced.

In a second aspect of the present invention, an area of the wood member in cross section perpendicular to an axis of the wood member in an axially predetermined region of the wood member is smaller than that in a region other than the predetermined region.

Therefore, when the impact load is axially applied to the wood member and the cylindrical member (the shock absorbing member), the predetermined region of the wood member of which the area in cross section is set to be smaller may be first crashed. Subsequently, the region other than the predetermined region of the wood member can be successively crashed.

Further, when the area of the wood member in cross section is uniform in the axial direction, a relatively large impact load may be required at the start of crash. Conversely, during the progression of crash, the wood member can be crashed by a load smaller than such a large load. Therefore, until the shock absorbing member (the wood member) starts to crash, a relatively large impact load can be applied to a vehicle via the shock absorbing member. However, according to the present invention, the predetermined region of the wood member of which the area in cross section is set to be smaller can be first crashed by a smaller force prior to the region other than the predetermined region. Therefore, the impact load applied to the shock absorbing member (the wood member or other such members) at the start of crash can be reduced. As a result, the impact load applied to the vehicle via the shock absorbing member (the wood member or other such members) can be reduced.

In a third aspect of the present invention, when under the assumption that the wood member of which an area in cross section is uniform in the axial direction thereof is axially collapsed by the impact load axially applied, the impact load applied to the wood member at the start of crash is named as an initial load and the impact load applied to the wood member during the progression of crash after the start of crash is named as a successive load, a ratio of the area of the wood member in cross section in the predetermined region to the area of the wood member in cross section in the region other than the predetermined region is set to be substantially equal to a ratio of the successive load to the initial load.

Therefore, the initial load of the shock absorbing member at the start of crash can be reduced to the extent of the successive load during the progression of crash, so that the vehicle can be prevented from being applied with a large load via the shock absorbing member.

In the invention of claim 4, the positioning means include a plurality of projections that are projected inwardly from the inner wall surface of the cylindrical member. The projections are positioned so as to circumferentially surround the outer surface of the wood member.

Therefore, the clearance formed between the outer surface of the wood member and the inner wall surface of the cylindrical member can be set to a desired value based on a projection amount of the projections from the inner wall surface of the cylindrical member.

In a fifth aspect of the present invention, the positioning means include a plurality of plate-shaped members that are interleaved between the inner wall surface of the cylindrical member and the outer surface of the wood member. The plate-shaped members are positioned so as to circumferentially surround the outer surface of the wood member.

Therefore, the clearance formed between the outer surface of the wood member and the inner wall surface of the cylindrical member can be set to a desired value based on a thickness of the plate-shaped members.

In a sixth aspect of the present invention, the cylindrical member has a rectangular cylindrical shape. The wood member has a rectangular columnar shape. The clearance has a constant size.

Therefore, the wood member and the cylindrical member can be circumferentially uniformly collapsed.

In a seventh aspect of the present invention, the cylindrical member includes an aluminum alloy molded article. The wood member includes a cedar wood member.

In an eighth aspect of the present invention, when a wall thickness of the cylindrical member is a range from about 0.4 mm to about 1.1 mm, the size of the clearance is set to 0.5 mm or more.

Therefore, a large load can be effectively received by the wood member. In addition, the cylindrical member can be crashed into the bellows-shape around the wood member, so as to circumferentially effectively support the wood member.

According to the present invention, it is possible to effectively absorb a high load generated in the event of a vehicle collision without complicating a structure.

DETAILED DESCRIPTION OF THE INVENTION

Embodiment 1

Figure 1:
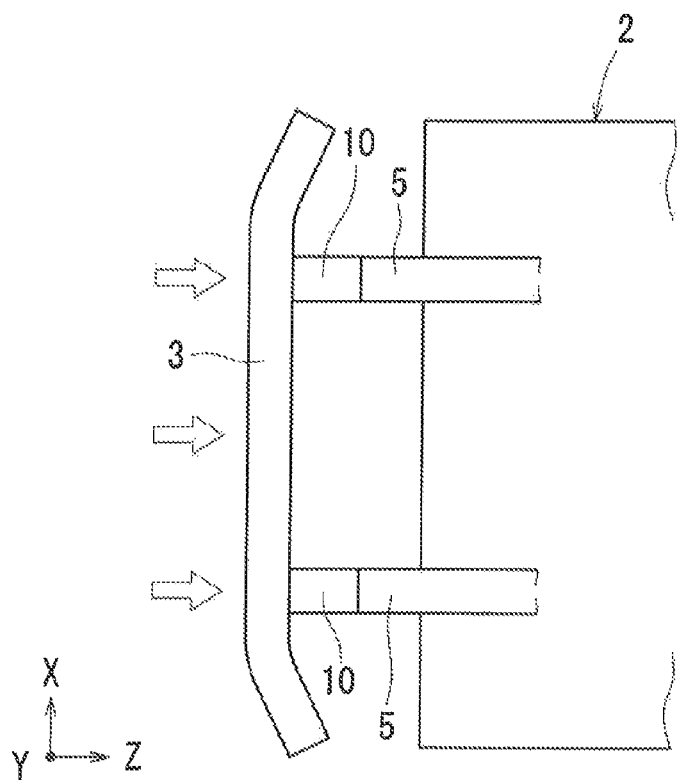
FIG. 1 is a schematic plan view of a vehicle front portion having a shock absorbing member according to Embodiment 1 of the present invention.

In the following, a shock absorbing member according to Embodiment 1 of the present invention will be described with reference to FIG. 1 to FIG. 12.

Further, an X-direction, a Y-direction and a Z-direction in the drawings respectively correspond to a width direction, a height direction and a front-back direction of a vehicle to which the shock absorbing member is attached.

<Regarding Outline of Attaching Portion of Shock Absorbing Member 10>

A shock absorbing member 10 according to the present embodiment is a member that is capable of receiving an impact load generated in the event of a vehicle collision and absorbing the impact load. As shown in FIG. 1, the shock absorbing member 10 is attached to each of crushable boxes that are disposed between a bumper reinforcement member 3 of a front bumper (not shown) and right and left side members 5 of a vehicle 2.

<Regarding Structure of Shock Absorbing Member 10>

As shown in FIG. 2 to FIG. 5, the shock absorbing member 10 may be composed of a cylindrical member 20, a wood member 12 received within the cylindrical member 20 while leaving a clearance S therebetween, positioning means 25 and 30 for positioning the wood member 12 relative to the cylindrical member 20.

The cylindrical member 20 may be an aluminum alloy molded article formed by extrusion molding and may have a rectangular cylindrical shape. Further, a wall thickness of the cylindrical member 20 may be set to about 0.5 mm. Preferably, the wall thickness of the cylindrical member 20 may be set to a range from about 0.4 mm to 1.1 mm.

As shown in FIG. 2 to FIG. 5, the wood member 12 may have a rectangular columnar shape. The wood member 12 may have a transverse cross-sectional shape identical to a cross-sectional shape (a transverse cross-sectional shape) of the cylindrical member 20 that is taken in a direction perpendicular to an axis of the cylindrical member 20. Further, the wood member 12 may have a length substantially identical to an axial length of the cylindrical member 20. The wood member 12 may have the rectangular columnar shape and may be configured such that an axial direction of annual rings 12k thereof may be aligned with a longitudinal direction (an axial direction) thereof. Therefore, in a condition in which the wood member 12 is introduced into the cylindrical member 20, the axial direction of the annual rings 12k of the wood member 12 may substantially be identical to an axial direction of the cylindrical member 20. That is, the wood member 12 may be received in the cylindrical member 20 while the axial direction of the annual rings 12k thereof is aligned with the axial direction of the cylindrical member 20.

Further, a cedar wood member may preferably be used as the wood member 12.

<Regarding Positioning Means 25 of Shock Absorbing Member 10>

Figure 4:
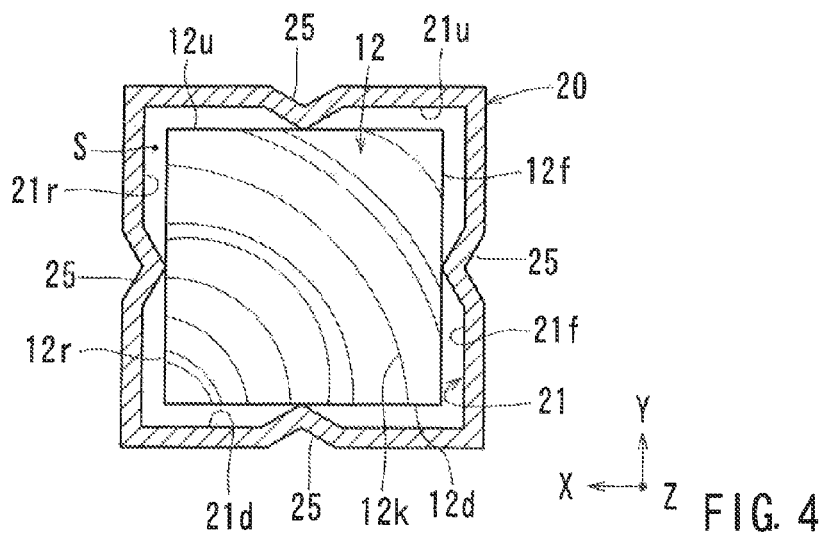
FIG. 4 is a schematic view viewed from a direction corresponding to line IV-IV of FIG. 2.

As shown in FIG. 4, V-shaped projections 25 acting as the positioning means may be formed in a distal end portion (a left end side in FIG. 2) of the cylindrical member 20. The V-shaped projections 25 may respectively be projected inwardly from an inner wall surface 21 of the cylindrical member 20, i.e., an upper surface 21u, a lower surface 21d, a left side surface 21f and a right side surface 21r of the cylindrical member 20. The V-shaped projections 25 may be projections that are capable of positioning the wood member 12 relative to the cylindrical member 20 such that a constant size of clearance (gap) S can be formed between the inner wall surface 21 of the cylindrical member 20, i.e., the upper surface 21u, the lower surface 21d, the left side surface 21f and the right side surface 21r of the cylindrical member 20, and an outer surface of the wood member 12, i.e., an upper surface 12u, a lower surface 12d, a left side surface 12f and a right side surface 12r of the wood member 12.

Figure 2:
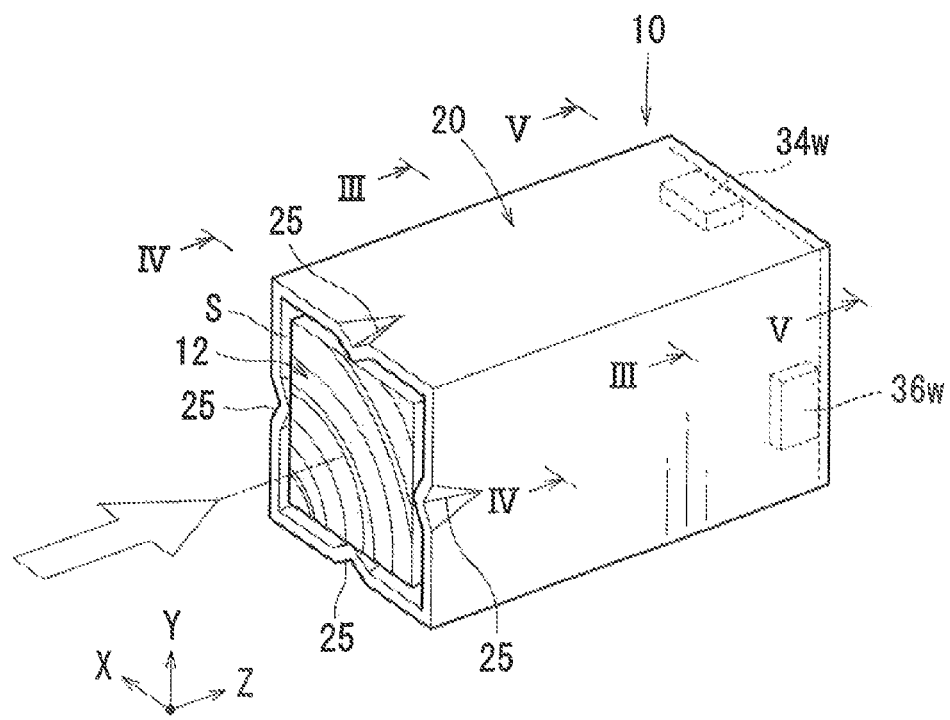
FIG. 2 is a whole perspective view of the shock absorbing member according to Embodiment 1 of the present invention.
Figure 3:
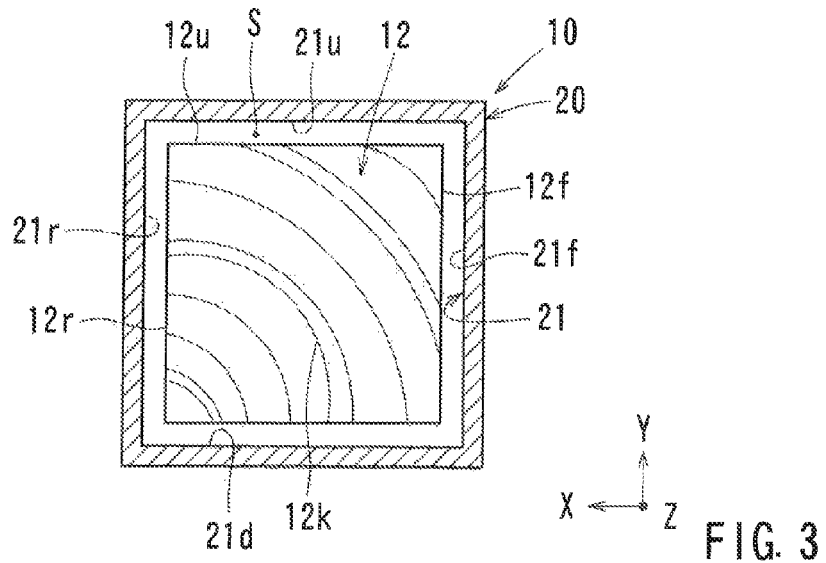
FIG. 3 is a schematic sectional view taken along line III-III of FIG. 2.

The V-shaped projections 25 may respectively formed in central portions of distal end portions of the upper surface 21u, the lower surface 21d, the left side surface 21f and the right side surface 21r. The four V-shaped projections 25 may have the same size of projection as each other. Further, as shown in FIG. 2, a projection amount of each of the V-shaped projections 25 may be maximized in a distal end position of the cylindrical member 20 and may be gradually reduced with increasing distance from the distal end position in an axial direction of the cylindrical member 20. Thus, when the wood member 12 is inserted into the cylindrical member 20 from a rear side of the cylindrical member 20, a distal end portion of the wood member 12 may be introduced into a center of the cylindrical member 20 while it is guided by the four V-shaped projections 25 during insertion. Further, as shown in FIG. 3 and FIG. 4, the substantially constant size of clearance S can be formed between the distal end side outer surface of the wood member 12 and the inner wall surface 21 of the cylindrical member 20.

<Regarding Positioning Means 30 of Shock Absorbing Member 10>

Figure 5:
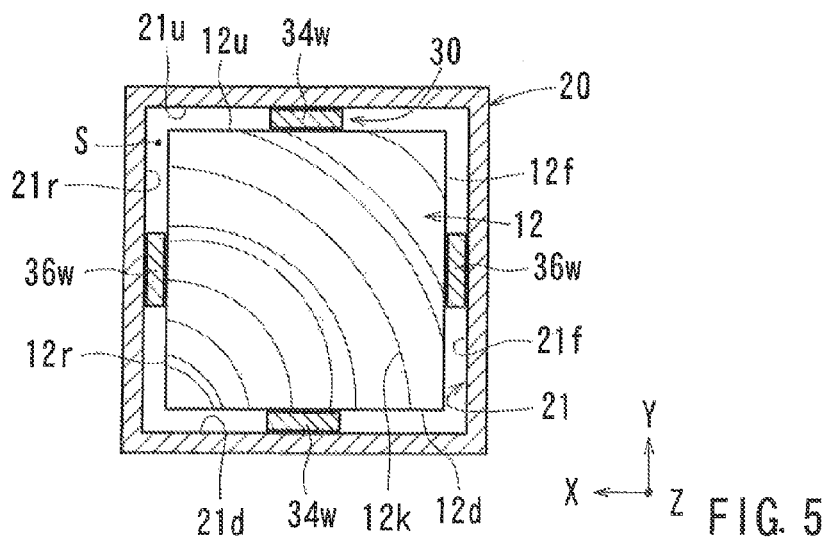
FIG. 5 is a schematic sectional view taken along line V-V of FIG. 2.
Figure 6:
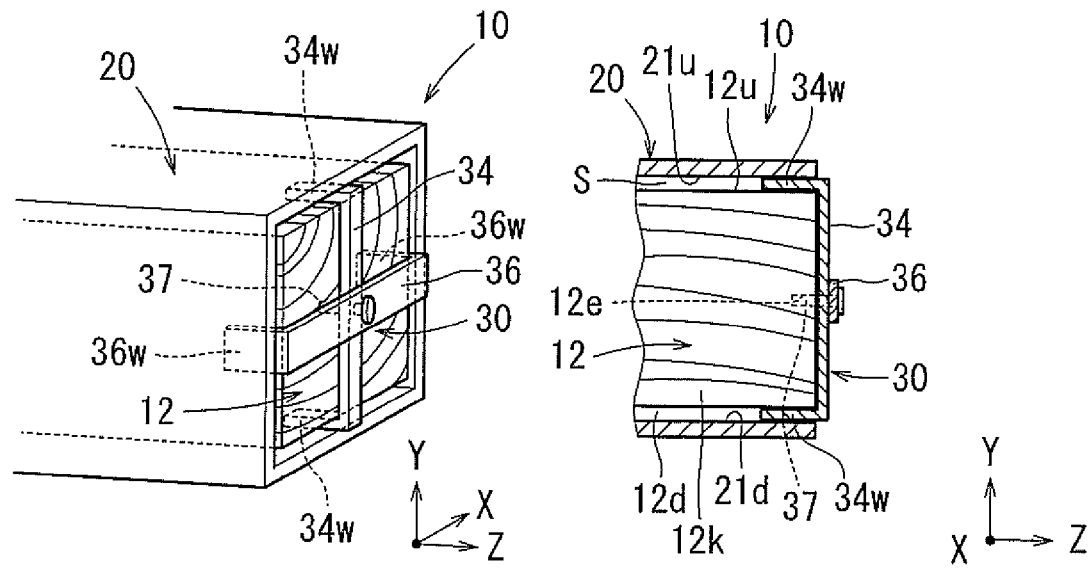
FIG. 6(A) is a schematic perspective view of a positioning mechanism constituting the shock absorbing member.
FIG. 6(B) is a side view of FIG. 6(A).
Figure 7:
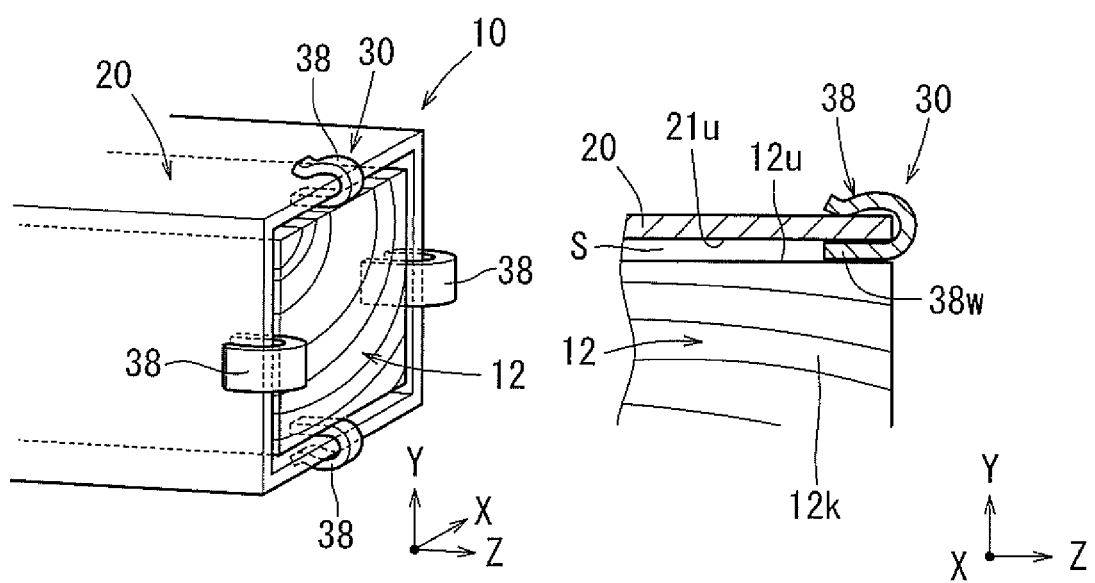
FIG. 7(A) is a schematic perspective view of another positioning mechanism constituting the shock absorbing member.
FIG. 7(B) is a side view of FIG. 7(A).
Figure 8:
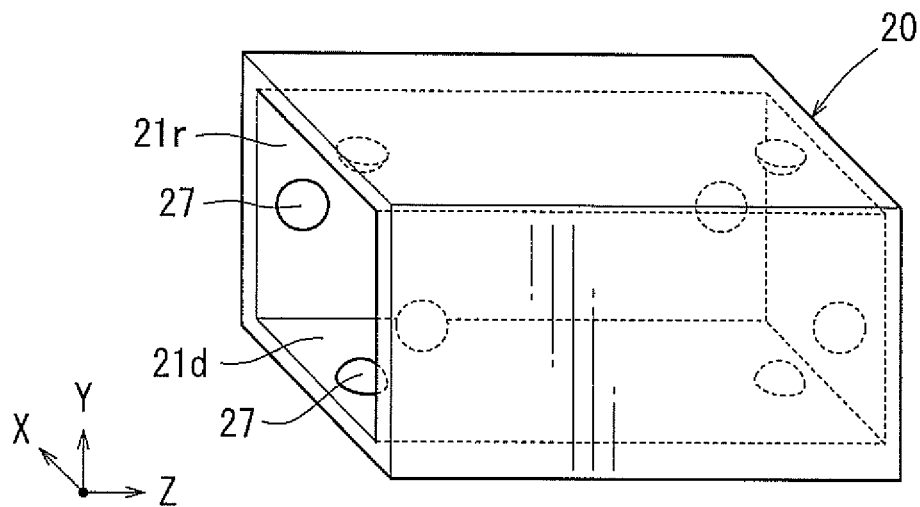
FIG. 8(A) is a schematic perspective view of another cylindrical member constituting the shock absorbing member.
FIG. 8(B) is a vertical sectional view of FIG. 8(A).
FIG. 8(C) is a side view of FIG. 8(B).
Figure 8:
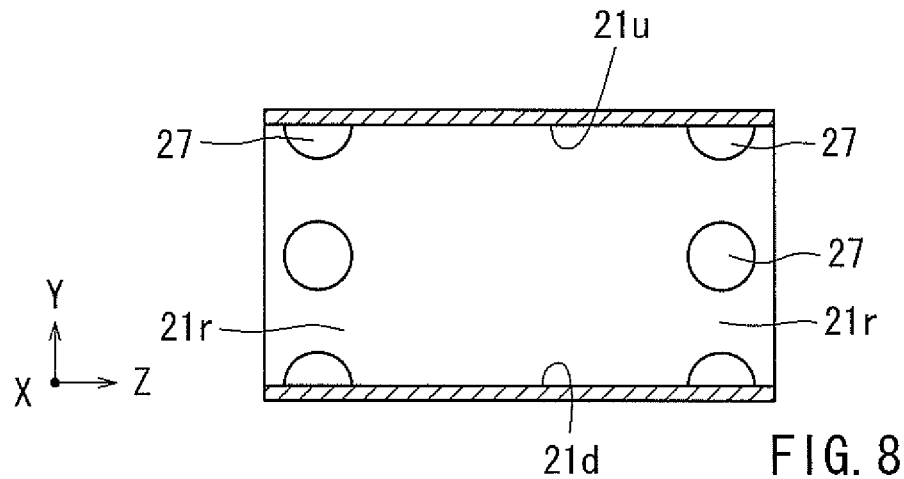
Figure 8:
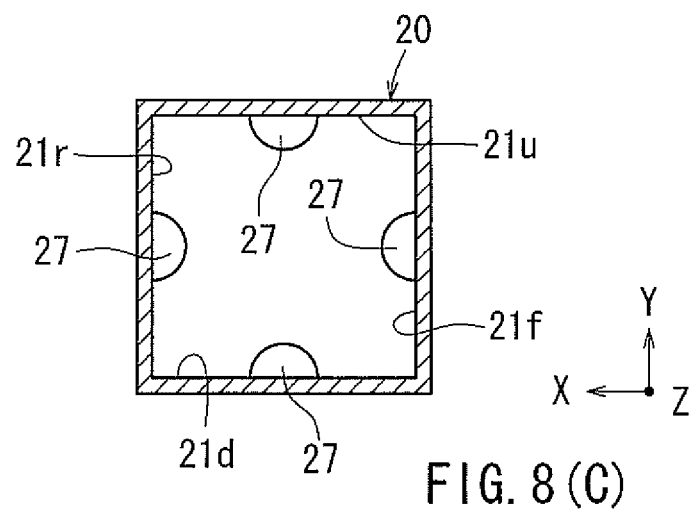

As shown in FIG. 5, the positioning means 30 may be disposed in a proximal end portion (a right end side in FIG. 2) of the cylindrical member 20. The positioning means 30 may function to position a proximal end portion of the wood member 12 relative to the proximal end portion of the cylindrical member 20 in a condition in which the wood member 12 is received within the cylindrical member 20.

As shown in FIGS. 6(A) (B), the positioning means 30 may be composed of a band plate-shaped vertical plate portion 34 and a band plate-shaped transverse plate portion 36 that are positioned across each other, and a positioning pin 37 that connects the vertical plate portion 34 and the transverse plate portion 36 at an intersecting portion thereof and projects in an orthogonal direction (forward) relative to the vertical plate portion 34 and the transverse plate portion 36. Further, upper and lower ends of the vertical plate portion 34 and upper and lower ends of the transverse plate portion 36 may respectively bent forwardly at a right angle, thereby forming insertion plate portions 34w and 36w.

As shown in FIG. 5, the upper and lower insertion plate portions 34w of the vertical plate portion 34 may respectively be inserted between the upper surface 21u of the cylindrical member 20 and the upper surface 12u of the wood member 12, and between the lower surface 21d of the cylindrical member 20 and the lower surface 12d of the wood member 12. Further, the right and left insertion plate portions 36w of the transverse plate portion 36 may respectively be inserted between the right side surface 21r of the cylindrical member 20 and the right side surface 12r of the wood member 12, and between the left side surface 21f of the cylindrical member 20 and the left side surface 12f of the wood member 12. Each of the insertion plate portions 34w and 36w of the vertical plate portion 34 and the transverse plate portion 36 may be set to the substantially same thickness as the clearance S. Further, the wood member 12 may have a positioning hole 12e (FIG. 6(B)) that is formed in a center of a rear end surface thereof. The positioning hole 12e may be configured such that the positioning pin 37 of the positioning means 30 can be inserted thereinto.

That is, in a condition in which the wood member 12 is received in the cylindrical member 20, when the insertion plate portions 34w of the vertical plate portion 34 and the insertion plate portions 36w of the transverse plate portion 36 are inserted into the clearance S formed between the proximal end side outer surface of the wood member 12 and the inner wall surface 21 of the cylindrical member 20 while the positioning pin 37 of the positioning means 30 is inserted into the positioning hole 12e of the wood member 12, the proximal end portion of the wood member 12 can be positioned in a center of the proximal end portion of the cylindrical member 20.

Thus, due to the V-shaped projections 25 formed in the distal end portion of the cylindrical member 20 and the positioning means 30, the distal end portion and the proximal end portion of the wood member 12 can be conformably positioned in central positions of the distal end portion and the proximal end portion of the cylindrical member 20 while the wood member 12 is concentrically aligned with the cylindrical member 20. As a result, as shown in FIG. 3, the clearance S (the gap) having the constant size over the entire circumference thereof can be formed between the outer surface of the wood member 12 and the inner wall surface 21 of the cylindrical member 20.

Further, the size of the clearance S may be set to a range from 0.8 mm to 1.3 mm. Preferably, the size of the clearance may be set to 0.5 mm or more.

As described above, the positioning means 30 that is composed of the vertical plate portion 34 and the transverse plate portion 36 positioned across each other and the positioning pin 37 is exemplified. However, as shown in FIGS. 7(A) (B), instead of the vertical plate portion 34, the transverse plate portion 36 and the positioning pin 37, four clips 38 having insertion plate portions 38w can be used.

Further, as shown in FIGS. 8(A)-(C), instead of the positioning means 30 and the V-shaped projections 25, semi-spherical projections 27 having the same size of projection as each other can be formed in the upper surface 21u, the lower surface 21d and the side surfaces 21r and 21f of the cylindrical member 20 in the distal and proximal end portions thereof.

Further, the insertion plate portions 38w of the clips 38 and the insertion plate portions 34w and 36w of the vertical plate portion 34 and the transverse plate portion 36 may correspond to plate-shaped members of the present invention.

<Regarding Action of Shock Absorbing Member 10>

Next, action of the shock absorbing member 10 will be described with reference to FIG. 9 and FIG. 10.

When a frontal collision occurs in the vehicle 2, an impact load is axially applied to the shock absorbing member 10. As shown in FIG. 10, when the impact load exceeds an acceptable value H (e.g., $5$-$6 \times 10^4$ N), the shock absorbing member 10 can be axially collapsed, so that the impact load can be absorbed. That is, the wood member 12 and the cylindrical member 20 constituting the shock absorbing member 10 can be applied with the impact load, so as to be axially collapsed by the impact load. Further, in FIG. 10, a vertical axis corresponds to magnitude of the impact load. Conversely, a horizontal axis corresponds to an axially collapsing amount (stroke) of the shock absorbing member 10.

As previously described, the clearance S that is set to the range from 0.8 mm to 1.3 mm may be formed between the outer surface of the wood member 12 and the inner wall surface 21 of the cylindrical member 20. Therefore, as shown in FIGS. 9(A)-(E), when the cylindrical member 20 is collapsed with the wood member 12, the cylindrical member 20 can be easily deformed radially inwardly. As a result, as shown in FIGS. 9(D) (E), the cylindrical member 20 can be collapsed into a bellows-shape around the wood member 12.

Figure 9A:
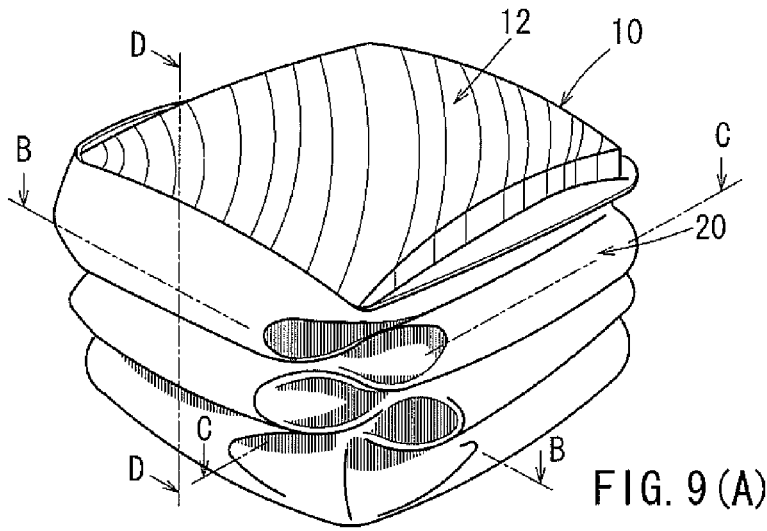
FIG. 9(A) is a schematic perspective view of the shock absorbing member, which view illustrates a condition in which the shock absorbing member is axially collapsed by an impact load applied thereto.
Figure 9B:
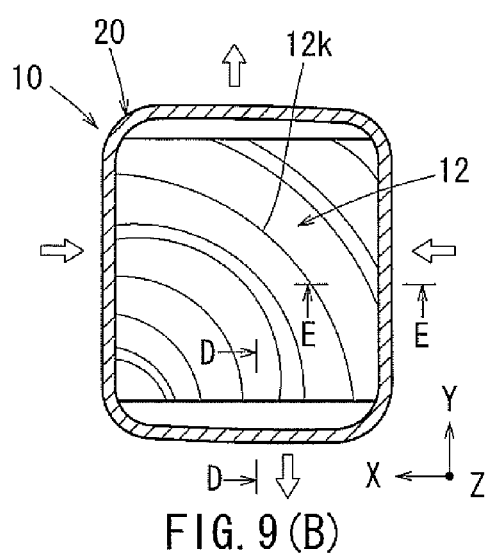
FIG. 9(B) is a sectional view taken along line B-B of FIG. 9(A).
Figure 9D:
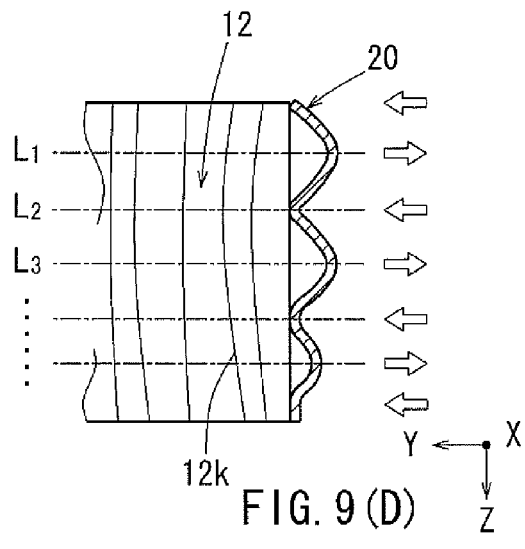
FIG. 9(D) is a sectional view taken along line D-D of FIG. 9(A).
Figure 10:
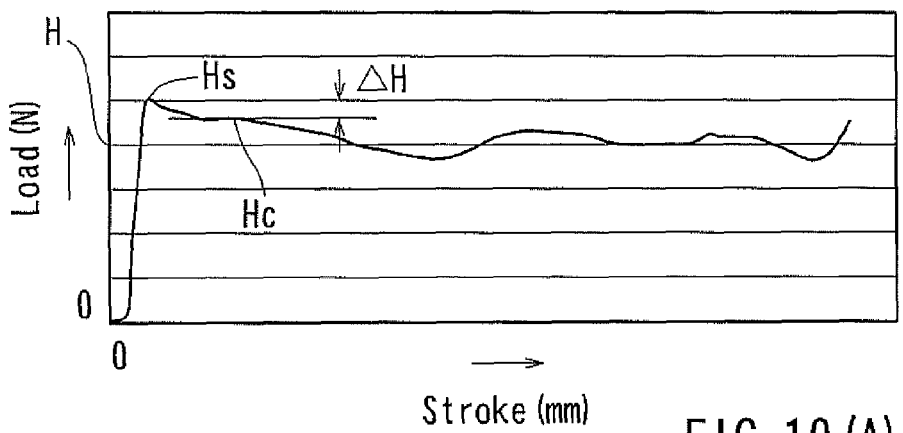
FIG. 10(A) is a graph illustrating a relationship between an impact load applied to the shock absorbing member and a collapsing amount (a stroke) of the shock absorbing member.
FIG. 10(B) is a graph illustrating a relationship between an impact load applied to the shock absorbing member and a collapsing amount (a stroke) of the shock absorbing member.
Figure 10:
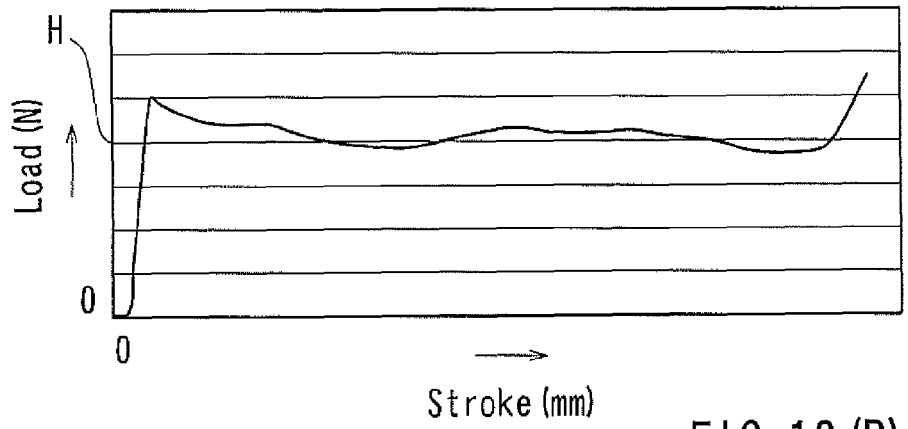

That is, in a first bent position L1 of the shock absorbing member 10 that is positioned adjacent to a distal end portion thereof (FIG. 9(D)), as shown in, for example, FIG. 9(B), an upper portion and a lower portion of the cylindrical member 20 can respectively be deformed radially outwardly whereas a left portion and a right portion of the cylindrical member 20 can respectively be deformed radially inwardly. Thus, in the first bent portion L1, the upper portion and the lower portion of the cylindrical member 20 can be bulged outwardly (FIGS. 9(B) (D)) while the left portion and the right portion of the cylindrical member 20 can be depressed inwardly to contact the outer surface of the wood member 12 (FIGS. 9(B) (E)).

Figure 9C:
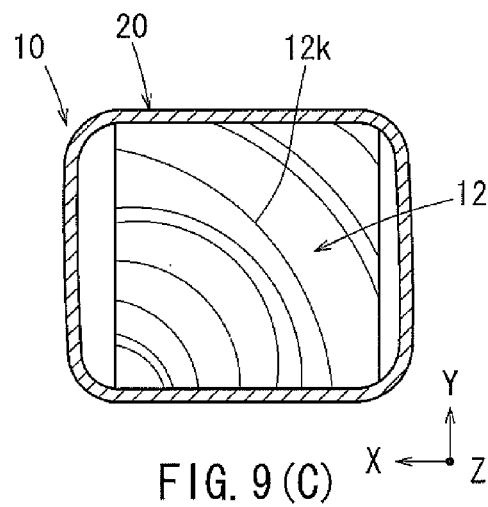
FIG. 9(C) is a sectional view taken along line C-C of FIG. 9(A).
Figure 9E:
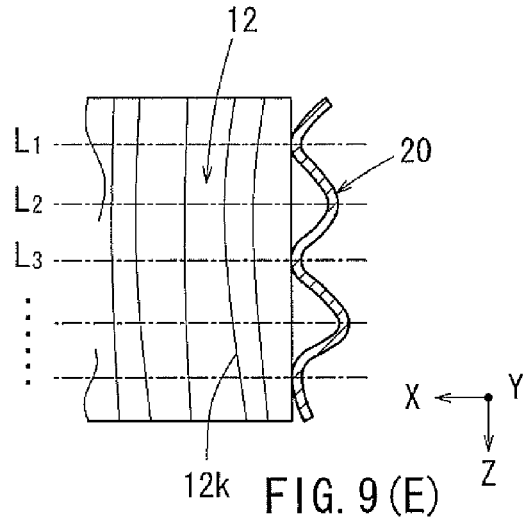
FIG. 9(E) is a sectional view taken along line E-E of FIG. 9(A).

Further, in a second bent position L2 that is positioned behind the first bent position L1, as shown in FIG. 9(C), the upper portion and the lower portion of the cylindrical member 20 can respectively be depressed inwardly to contact the outer surface of the wood member 12 while the left portion and the right portion of the cylindrical member 20 can be bulged outwardly.

Further, in a third bent position L3 that is positioned behind the second bent position L2, the cylindrical member 20 can be deformed in a manner similar to the first bent position L1. Conversely, in a fourth bent position L4 that is positioned behind the third bent position L3, the cylindrical member 20 can be deformed in a manner similar to the second bent position L2.

That is, the cylindrical member 20 can be collapsed into the bellows-shape around the wood member 12 while the upper portion and the lower portion thereof are out of phase with the left portion and the right portion by 90 degrees.

Thus, the cylindrical member 20 can be collapsed into the bellows-shape around the wood member 12. Therefore, the cylindrical member 20 can prevent the wood member 12 from falling down. As a result, the wood member 12 can be reliably crashed axially. Therefore, as shown in FIG. 10, the impact load can be absorbed for the collapsing stroke of the wood member 12.

FIG. 10(A) shows a graph that is obtained in a condition in which the size of the clearance S is set to 0.8 mm. Conversely, FIG. 10(B) shows a graph that is obtained in a condition in which the size of the clearance S is set to 1.3 mm.

Further, when the size of the clearance S is close to zero, the cylindrical member 20 cannot be collapsed into the bellows-shape around the wood member 12. Instead, the cylindrical member 20 can be partially torn axially. Therefore, the cylindrical member 20 cannot support the wood member 12 in a balanced manner. As a result, the wood member 12 can fall down halfway, so that the impact load axially applied cannot be effectively absorbed.

<Advantage of Shock Absorbing Member 10 of Present Embodiment>

According to the shock absorbing member 10 of the present embodiment, the wood member 12 may be received in the cylindrical member 20 while the axial direction of the annual rings 12k thereof is aligned with the axial direction of the cylindrical member 20. Therefore, the load axially applied can be received by the annual rings 12k of the wood member 12. As a result, a high load can be received by the wood member 12.

Further, because the clearance S may be formed between the outer surface of the wood member 12 and the inner wall surface 21 of the cylindrical member 20, when the cylindrical member 20 is axially crashed with the wood member 12, the cylindrical member 20 can be deformed radially inwardly. As a result, the cylindrical member 20 can be crashed into the bellows-shape around the wood member 12. That is, the cylindrical member 20 can be prevented from being partially torn axially. Thus, the wood member 12 can be circumferentially supported by the cylindrical member 20 crashed into the bellows-shape in a balanced manner, so as to be less likely to fall down. As a result, the axial load can be effectively received by the wood member 12. Thus, the wood member 12 and the cylindrical member 20 can be axially collapsed, so that the high load can be effectively absorbed.

Further, the shock absorbing member can be formed by simply introducing the wood member 12 into the cylindrical member 20. Therefore, the shock absorbing member can be simplified in structure, so that costs thereof can be reduced.

Further, the positioning means may include a plurality of projections 25 and 27 projected from the inner wall surface 21 of the cylindrical member 20. These projections may be positioned so as to circumferentially surround the outer surface of the wood member 12. Therefore, the clearance S formed between the outer surface of the wood member 12 and the inner wall surface 21 of the cylindrical member 20 can be set to a desired value by changing the projection amount of the projections 25 and 27.

In addition, the positioning means may include a plurality of the plate-shaped members (the insertion plate portions 34w, 36w and 38w) that are interleaved between the inner wall surface of the cylindrical member 20 and the outer surface of the wood member 12. These members are positioned so as to circumferentially surround the outer surface of the wood member 12. Therefore, the clearance S formed between the outer surface of the wood member 12 and the inner wall surface 21 of the cylindrical member 20 can be set to a desired value by changing a thickness of the plate-shaped members (the insertion plate portions 34w, 36w and 38w).

Further, the cylindrical member 20 may have the rectangular cylindrical shape. Conversely, the wood member 12 may have the rectangular columnar shape. Further, the clearance S may have the constant size. Therefore, the wood member 12 and the cylindrical member 20 can be circumferentially uniformly collapsed.

Further, the cylindrical member 20 may be the aluminum alloy molded article formed by extrusion molding. Conversely, the wood member 12 may be the cedar wood member. Therefore, the large load can be effectively received by the wood member 12. In addition, the cylindrical member 20 can be crashed into the bellows-shape around the wood member 12, so as to circumferentially effectively support the wood member 12.

<Modified Forms>

Figure 11:
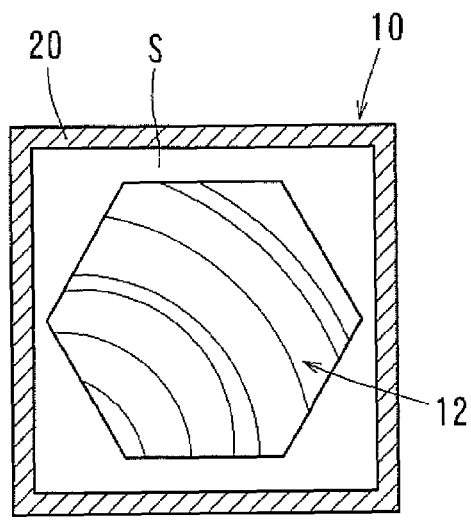
FIG. 11 is a schematic transverse sectional view of a shock absorbing member according to a modified form.
Figure 12:
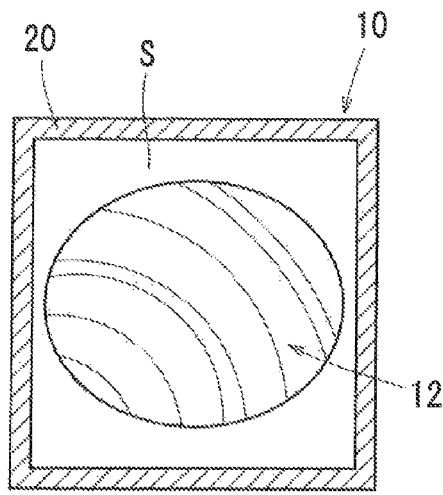
FIG. 12 is a schematic transverse sectional view of a shock absorbing member according to a modified form.

The present invention is not limited to the embodiment described above and can be changed or modified without departing from the scope of the present invention. In the present embodiment, the wood member 12 having the rectangular columnar shape is inserted into the cylindrical member 20 having the rectangular cylindrical shape while the size of the clearance S is maintained constant. However, as shown in FIG. 11, the wood member 12 having a hexagonal columnar shape can be inserted into the cylindrical member 20 having the rectangular cylindrical shape. Alternatively, as shown in FIG. 12, the wood member 12 having an ellipsoidal columnar shape can be inserted into the cylindrical member 20 having the rectangular cylindrical shape.

Further, the aluminum alloy molded article formed by extrusion molding is used as the cylindrical member 20. However, the cylindrical member 20 can be formed by pultrusion molding using an aluminum extrusion grade material. Further, the cylindrical member 20 can be formed using a resinous material that is configured to be crashed into the bellows-shape.

Embodiment 2

Next, a shock absorbing member 50 according to Embodiment 2 of the present invention will be described with reference to FIGS. 13 to 18.

The shock absorbing member 50 of the present embodiment may have the same structure as the shock absorbing member 10 of Embodiment 1 provided that an area of the wood member 12 in transverse cross section (in cross section perpendicular to an axis) is changed in the axial direction of the wood member 12. Therefore, portions that are the same as the shock absorbing member 10 of Embodiment 1 will be identified by the same reference numerals and a description thereof may be omitted.

Figure 13:
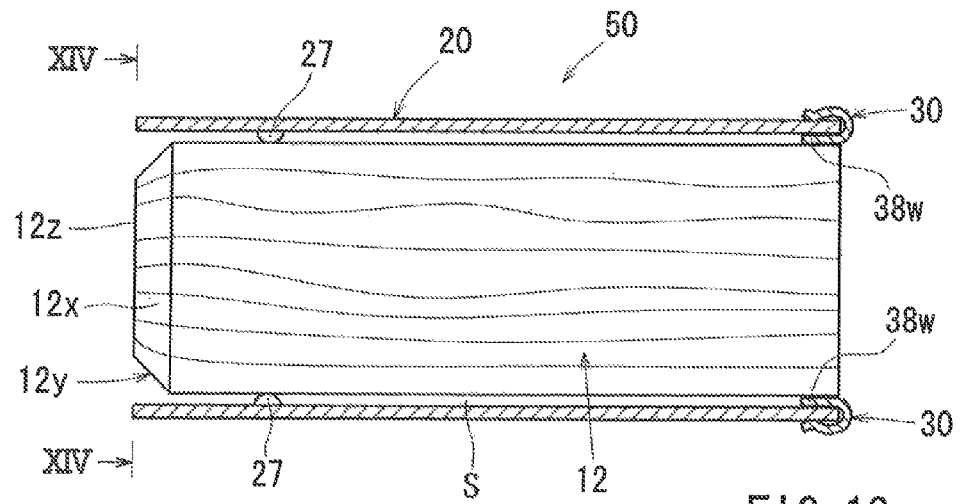
FIG. 13 is a schematic vertical sectional view of a shock absorbing member according to Embodiment 2 of the present invention.
Figure 14:
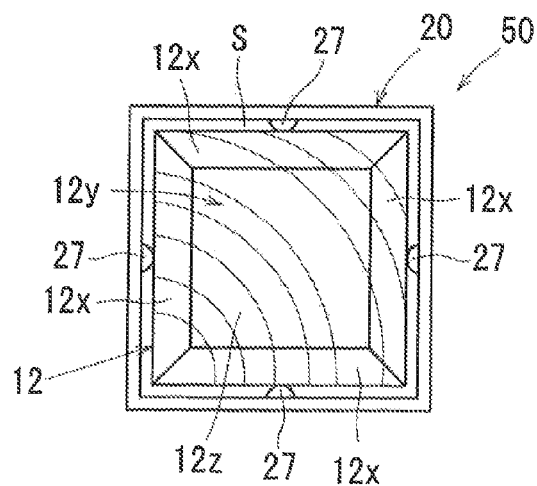
FIG. 14 is a view viewed from a direction corresponding to line XIV-XIV of FIG. 13.

As shown in FIG. 13 and FIG. 14, the wood member 12 of the shock absorbing member 50 may have a substantially rectangular columnar shape. Four sides of a rectangular distal end of the wood member 12 may respectively be chamfered obliquely. That is, a distal end portion 12y of the wood member 12 may have a rectangular truncated cone-shape that is defined by upper, lower, right and left inclined surfaces 12x and a square distal end surface 12z. Therefore, an area of the distal end surface 12z of the wood member 12 may correspond to an area of an upper base of the rectangular truncated cone-shaped portion. Thus, in the distal end portion 12y of the wood member 12, the area of the wood member 12 in cross section taken in the direction perpendicular to the axis can be gradually increased from the area of the upper base of the rectangular truncated cone-shaped portion (an area Su of the distal end surface 12z) toward an area of a lower base of the rectangular truncated cone-shaped portion (an area Sd of a bottom surface). Further, in a portion other than the distal end portion 12y of the wood member 12, the area of the wood member 12 in cross section taken in the direction perpendicular to the axis may be equal to the area of the lower base of the rectangular truncated cone-shaped portion (the area of the bottom surface).

Generally, a load that is required to axially crash the wood member 12 may substantially be proportional to the area of the wood member 12 in cross section taken in the direction perpendicular to the axis of the wood member 12. As described above, in this embodiment, a cross-sectional area of the wood member 12 in the distal end portion 12y may be set to be smaller than a cross-sectional area of the wood member 12 in the portion other than the distal end portion 12y. Therefore, the distal end portion 12y of the wood member 12 can be first crashed by a relatively low load. Subsequently, the portion other than the distal end portion 12y of the wood member 12 can be crashed.

Further, the distal end portion 12y of the wood member 12 may correspond to a predetermined region of the present invention.

Further, as in the case of Embodiment 1, when an area of the wood member 12 in cross section is uniform in the axial direction of the wood member 12, as shown in FIG. 10(A) or other drawings, an impact load (an initial load Hs) applied to the wood member 12 at the start of crash may be greater than an impact load (a successive load Hc) applied to the wood member during the progression of crash by an amount of about $\Delta H (\Delta H \approx Hs - Hc)$.

In the shock absorbing member 50 of the present embodiment, a ratio of the area Su of the distal end surface 12z of the wood member 12 (the area of the upper base of the rectangular truncated cone-shaped portion) to the area Sd of the wood member 12 in the portion other than the distal end portion 12y (the area of the lower base of the rectangular truncated cone-shaped portion), i.e., Su/Sd, may be set to be substantially equal to the successive load Hc/the initial load Hs.

Figure 15:
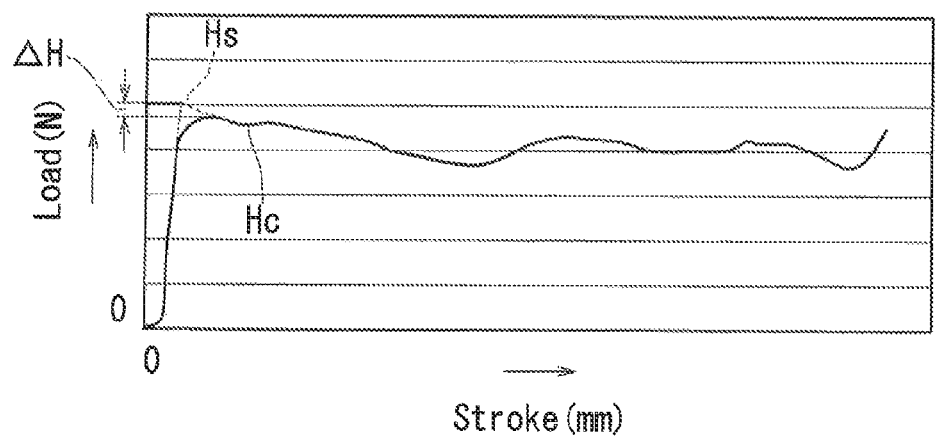
FIG. 15 is a set of measured data illustrating a relationship between an impact load applied to the shock absorbing member and a collapsing amount (a stroke) of the shock absorbing member.

When the impact load is axially applied to the shock absorbing member 50 due to the frontal collision of the vehicle 2, a distal end portion of the shock absorbing member 50 can be first crashed by a relatively low load. Subsequently, a portion other than the distal end portion of the shock absorbing member 50 can be crashed. Therefore, as shown in FIG. 15, the impact load (the initial load Hs) applied to the shock absorbing member 50 (the wood member 12 or other such members) at the start of crash can be reduced to the extent of the successive load Hc. Thus, the vehicle 2 can be prevented from being applied with a large load at the start of crash of the shock absorbing member 50.

<Modified Forms>

Figure 16:
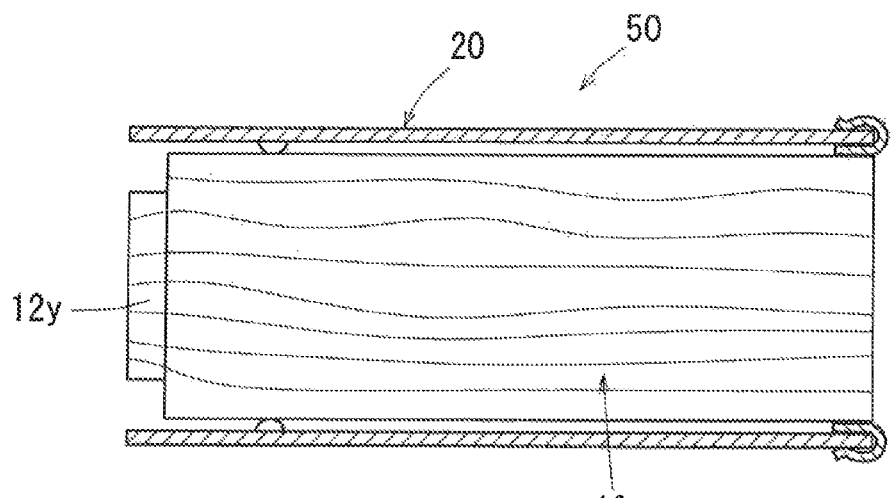
FIG. 16 is a schematic vertical sectional view of a shock absorbing member according to a modified form.

The present invention is not limited to the embodiment described above and can be changed or modified without departing from the scope of the present invention. In the present embodiment, as shown in FIG. 13, the distal end portion 12y of the wood member 12 of the shock absorbing member 50 may be shaped into the rectangular truncated cone-shape. However, as shown in FIG. 16, the distal end portion 12y of the wood member 12 can be circumferentially cut off so as to form a shouldered portion therearound, so that the area of the distal end portion 12y in cross section can be uniform in the axial direction of the wood member 12. Thus, the impact load (the initial load Hs) applied to the shock absorbing member 50 (the wood member 12 or other such members) at the start of crash can be further reduced.

Figure 17:
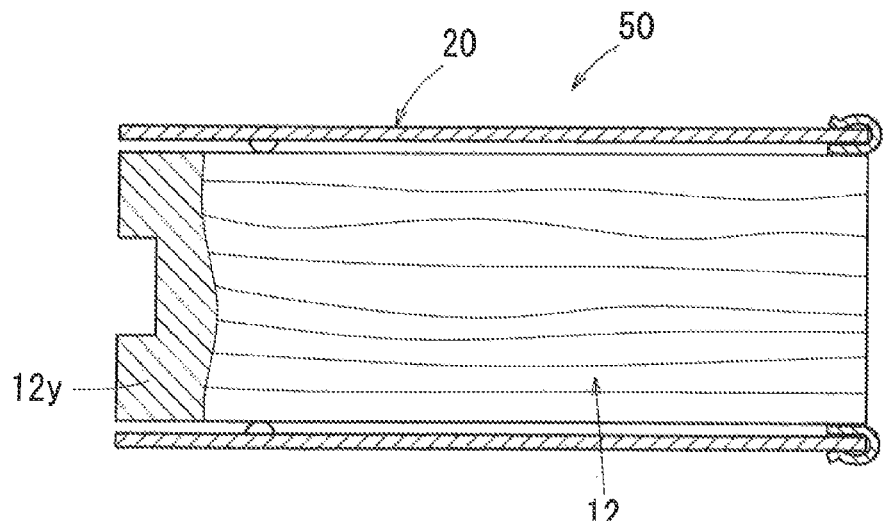
FIG. 17 is a schematic vertical sectional view of a shock absorbing member according to a modified form.

Further, as shown in FIG. 17, instead of circumferentially cutting off the distal end portion 12y of the wood member 12, a central portion the distal end portion 12y of the wood member 12 can be removed so as to form a recessed portion having a rectangular columnar shape or a columnar shape.

Figure 18:
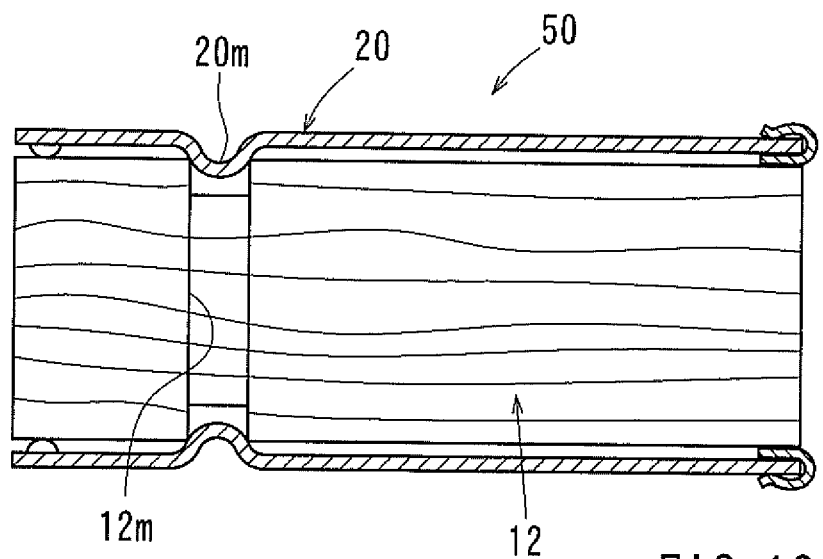
FIG. 18 is a schematic vertical sectional view of a shock absorbing member according to a modified form.
Figure 19:
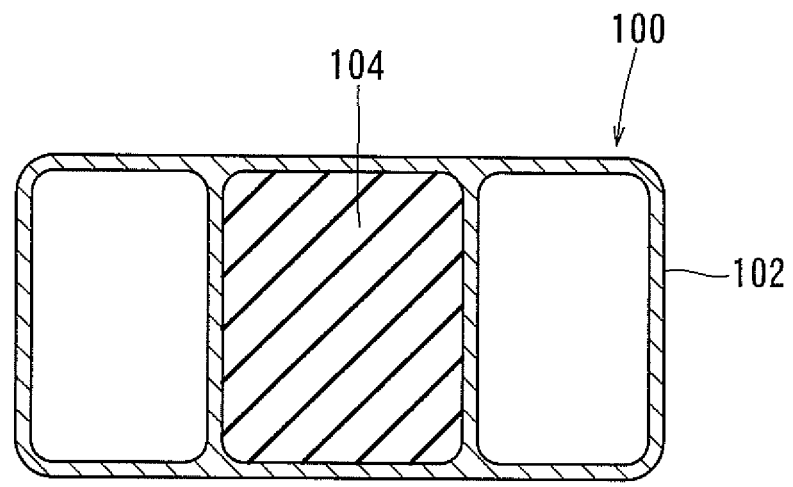
FIG. 19 is a transverse sectional view of a conventional shock absorbing member.

Further, in the present embodiment, the distal end portion 12y of the wood member 12 may be processed. However, as shown in FIG. 18, the wood member 12 can have a groove 12m that is circumferentially formed in a middle portion in the axial direction thereof, so that the portion of the wood member 12 can have a cross-sectional area smaller than a cross-sectional area of the other portions of the wood member 12. In such a case, the cylindrical member 20 covering the wood member 12 may be pressed along a line corresponding to the groove 12m of the wood member 12 in a post-processing step, so as to engage the groove 12m in a pressed portion thereof. Thus, the cylindrical member 20 can be axially positioned relative to the wood member 12.

Further, the groove 12m of the wood member 12 may correspond to the predetermined region of the present invention.

In addition, in the present embodiment, the wood member 12 having the substantially rectangular columnar shape. However, the cross-sectional shape of the wood member 12 can be appropriately changed.

The invention claimed is:

1. A shock absorbing member, comprising:
a cylindrical member that is configured to receive an impact load axially applied and to be axially collapsed,
a wood member that is received in the cylindrical member while an axial direction of annual rings thereof is aligned with an axial direction of the cylindrical member, and
a positioning portion positioning the wood member relative to the cylindrical member such that a clearance can be formed between an outer surface of the wood member and an inner wall surface of the cylindrical member over an entire circumference thereof,
wherein the wood member and the cylindrical member are configured to receive the impact load in an axial direction thereof.

2. The shock absorbing member as defined in claim 1, wherein an area of the wood member in cross section perpendicular to an axis of the wood member in an axially predetermined region of the wood member is smaller than that in a region other than the predetermined region.

3. The shock absorbing member as defined in claim 2, wherein when under the assumption that the wood member of which an area in cross section is uniform in the axial direction thereof is axially collapsed by the impact load axially applied, the impact load applied to the wood member at the start of crash is named as an initial load and the impact load applied to the wood member during the progression of crash after the start of crash is named as a successive load, a ratio of the area of the wood member in cross section in the predetermined region to the area of the wood member in cross section in the region other than the predetermined region is set to be substantially equal to a ratio of the successive load to the initial load.

4. The shock absorbing member as defined in claim 1, wherein the positioning portion comprises a plurality of projections that are projected inwardly from the inner wall surface of the cylindrical member, the projections being positioned so as to circumferentially surround the outer surface of the wood member.

5. The shock absorbing member as defined in claim 1, wherein the positioning portion comprises a plurality of plate-shaped members that are interleaved between the inner wall surface of the cylindrical member and the outer surface of the wood member, the plate-shaped members being positioned so as to circumferentially surround the outer surface of the wood member.

6. The shock absorbing member as defined in claim 1, wherein the cylindrical member has a rectangular cylindrical shape, wherein the wood member has a rectangular columnar shape, and wherein the clearance has a constant size.

7. The shock absorbing member as defined in claim 1, wherein the cylindrical member comprises an aluminum alloy molded article, and wherein the wood member comprises a cedar wood member.

8. The shock absorbing member as defined in claim 7, wherein when a wall thickness of the cylindrical member is in a range from about 0.4 mm to about 1.1 mm, the size of the clearance is set to 0.5 mm or more.

* * * * *